(No Model.) 2 Sheets—Sheet 1.
B. KRAUSE.
COMBINATION SPECTACLES.

No. 378,965. Patented Mar. 6, 1888.

WITNESSES:
W. R. Davis
C. Sedgwick

INVENTOR:
B. Krause
BY Munn & Co
ATTORNEYS.

(No Model.) 2 Sheets—Sheet 2.
B. KRAUSE.
COMBINATION SPECTACLES.
No. 378,965. Patented Mar. 6, 1888.
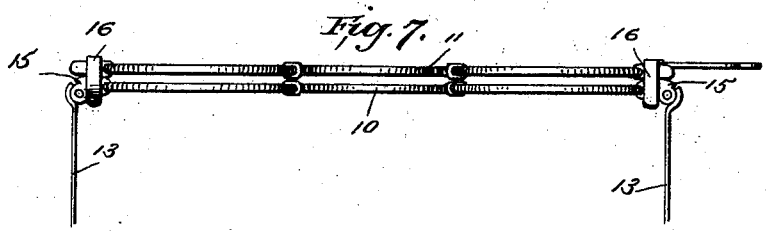
Fig. 7.
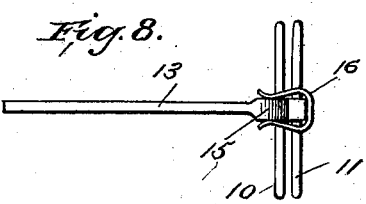
Fig. 8.
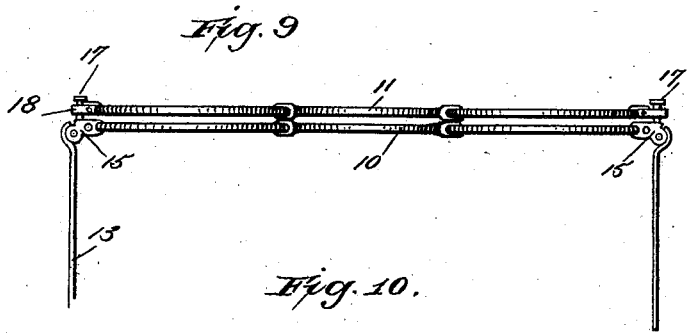
Fig. 9.
Fig. 10.
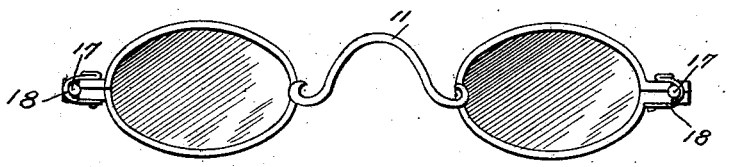
Fig. 11.
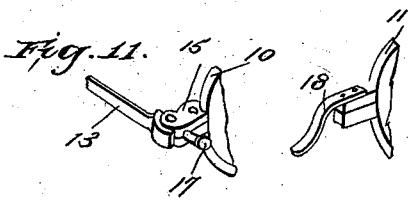
WITNESSES:
W. R. Davis.
C. Sedgwick.
INVENTOR:
B. Krause.
BY Munn &Co.
ATTORNEYS.

UNITED STATES PATENT OFFICE.

BERNARD KRAUSE, OF O'FALLON DEPOT, ILLINOIS.

COMBINATION-SPECTACLES.

SPECIFICATION forming part of Letters Patent No. 378,965, dated March 6, 1888.

Application filed September 14, 1887. Serial No. 249,632. (No model.)

*To all whom it may concern:*

Be it known that I, BERNARD KRAUSE, of O'Fallon Depot, in the county of St. Clair and State of Illinois, have invented a new and useful Combination of Templed Spectacles with Detachable Untempled Spectacles, of which the following is a full description.

The object of bifocal lenses is to avoid the annoyance of changing distance-spectacles with reading-spectacles. The upper half of bifocals is intended for distance, the lower half for reading. Bifocals, even when ground of one piece, (solid bifocals) are irritating, and therefore injurious to the eyes. Therefore some persons prefer the use of distance-spectacles, and if wanted to read put ordinary eyeglasses in front of them, which by this combination make the focus for reading. This practice is as objectionable as the use of bifocals, as the centers of the two sets of lenses never converge exactly.

The object of my invention is to provide combination-spectacles, by means of which the use of bifocal spectacles or eyeglasses will be dispensed with.

My combination is intended to avoid the evils above mentioned.

To the ends above mentioned my invention consists of a combination of templed spectacles and templeless spectacles that are detachably connected and bodily removable one from the other, the arrangement being such that when the templed spectacles and templeless spectacles are connected the focuses of the two sets of lenses will converge exactly and the lenses of the spectacles which are usually used for distance will be corrected by the templeless spectacles to form reading-spectacles. When desired to use distance-spectacles, disengage the untempled spectacles and remove them bodily from the frame of the templed spectacles.

Reference is to be had to the accompanying drawings, forming a part of this specification, in which similar figures of reference indicate corresponding parts in all the views.

Figure 1:
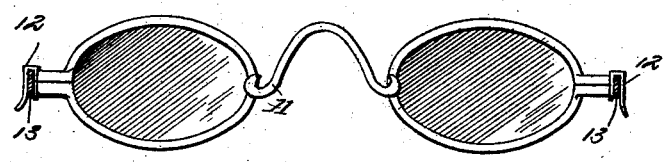
Figure 2:
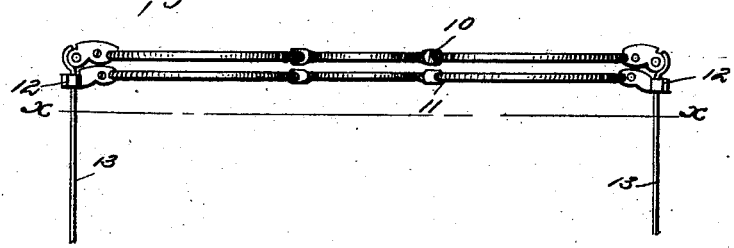
Figure 3:
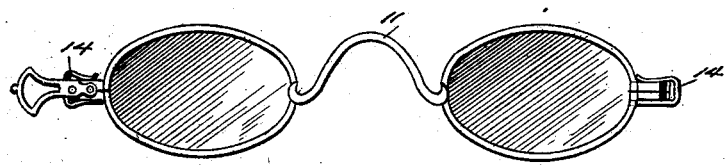
Figure 4:
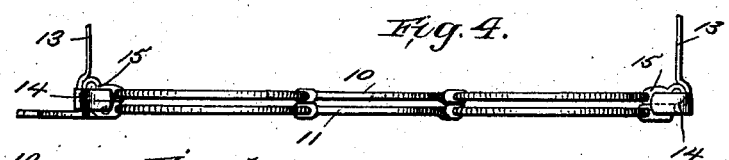
Figure 5:
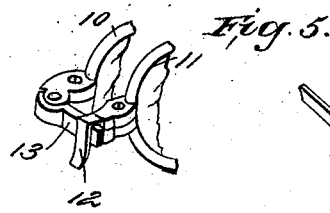
Figure 6:
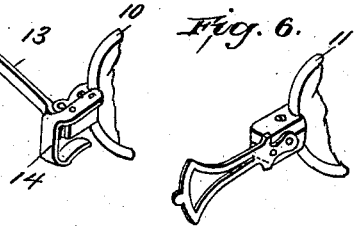

Figure 1 is a view taken on line *x x* of Fig. 2, the view being given to illustrate the construction wherein the templeless spectacles are provided with end clips which fit over the templed spectacle-bows. Fig. 2 is a plan view of the construction illustrated in Fig. 1. Fig. 3 is a face view of a modified construction wherein the templed spectacle-frame is shown as being provided with clips which engage the end lugs of the templeless spectacle-frame. Fig. 4 is a plan view of the construction of Fig. 3. Fig. 5 is a detail perspective view of the construction illustrated in Figs. 1 and 2. Fig. 6 is a detail perspective view of the construction illustrated in Figs. 3 and 4, that portion of the templeless spectacles shown being represented as it appears when separated from the templed spectacle-frame. Fig. 7 is a plan view of a construction wherein the templeless frame is represented as being provided with clips which engage the end lugs of the templed spectacle-frame. Fig. 8 is a side view of the construction illustrated in Fig. 7. Fig. 9 is a plan view of a construction wherein the templeless spectacle-frame is represented as being provided with clips which engage pins that are carried by the templed spectacle-frame. Fig. 10 is a face view of the construction in Fig. 9; and Fig. 11 is a perspective detail view illustrating the said construction, the templed spectacle and templeless spectacle-frames being however represented as they appear when separated, and the clip upon the templeless spectacle-frame being represented as it appears prior to being bent to place.

In the drawings above referred to, 10 represents the templed spectacle-frame, and 11 the templeless spectacle-frame, one or the other of said frames being provided with a clip that is adapted to engage a proper portion of the other frame, the arrangement being such that if a party uses for distance No. 14 templed spectacles and for reading No. 7 templed spectacles he can, by adjusting a pair of templeless spectacles of No. 15½ in connection with his No. 14 distance-glasses, so correct the distance-glasses that they will have the same effect as the No. 7 reading templed spectacles, this connection between the templed and untempled spectacles being brought about in any manner desired, the only requirement being that the two sets of lenses connected shall be accurately centered.

In Figs. 1, 2, and 5 I represent the templeless spectacle-frame as being provided with end spring-clips, 12, which are arranged to fit over the templed spectacle-bows 13, the templeless spectacles in this case being placed just inside of the templed spectacle-frame.

In Figs. 3, 4, and 6 I illustrate a construction wherein the templeless spectacle-frame is provided with spring-clips 14, which fit over the hinge lugs 15 of the templed spectacle-frame, the templeless spectacles in this case being in advance of the templed spectacle-frame and the clips fitting over the ends of the lugs 15; but, if desired, the clips might be formed so as to pass inward from the front of the lugs 15, as is shown at 16 in Figs. 7 and 8.

In Figs. 9, 10, and 11 I have represented the lugs 16 as being provided with forward-extending pins 17, that are engaged by spring-clips 18, that are carried by templeless spectacle-frame 11.

Many other mechanical devices for connecting the two frames and holding their lenses in proper connection might be employed without departing from the spirit of my invention, the essential feature of which is the connection of two frames, for the purpose hereinbefore set forth.

Having described my invention, I claim as new and desire to secure by Letters Patent—

1. The combination, with two templed and framed spectacle-lenses, of two supplemental detachable untempled framed spectacle-lenses connected with and bodily removable from the templed frame for drawing the focus of the templed from distance to reading spectacles, substantially as described.

2. The combination, with a lens-frame, of a second detachable and bodily removable lens-frame, and means, substantially as described, for connecting the frames.

3. The combination, with a lens-frame, of a second detachable lens-frame, and spring-clips by which the frames are connected, as described.

4. The combination, with a templed spectacle-frame, of a detachable templeless spectacle-frame provided with clips to engage the bows of the templed spectacle-frame, as described.

BERNARD KRAUSE.

Witnesess:
JOHN BAYOT,
EDGAR KRAUSE.